June 10, 1930.  H. L. SMITH  1,762,839
BUILDING TIRE CASINGS
Filed Nov. 22, 1926
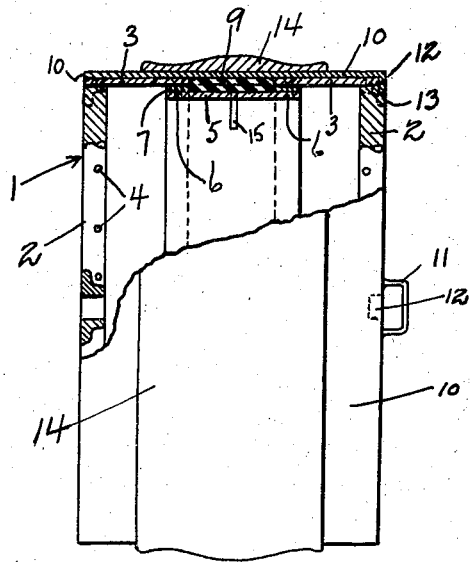
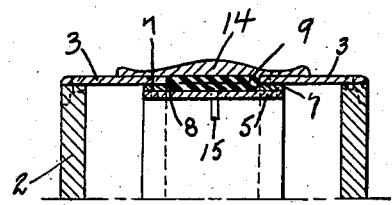
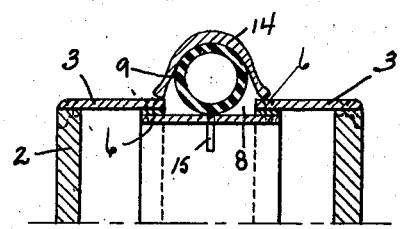
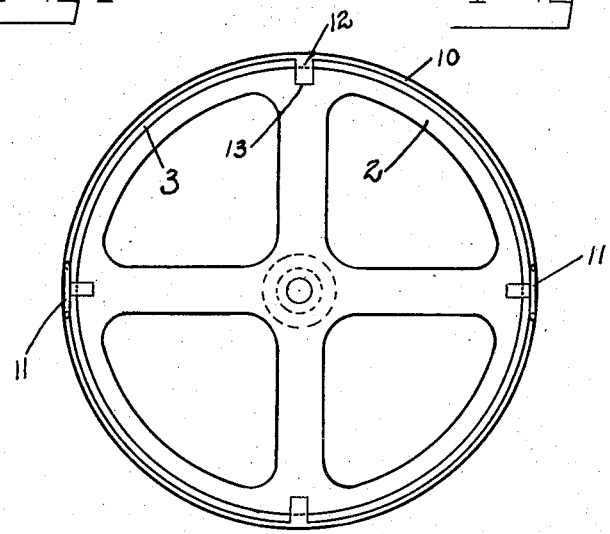
Harry L. Smith
Inventor
By
Attorney Patented June 10, 1930

1,762,839

UNITED STATES PATENT OFFICE

HARRY L. SMITH, OF CUDAHY, WISCONSIN, ASSIGNOR TO THE FISK RUBBER COMPANY, OF CHICOPEE FALLS, MASSACHUSETTS, A CORPORATION OF MASSACHUSETTS

BUILDING TIRE CASINGS

Application filed November 22, 1926. Serial No. 150,054.

My invention relates to the manufacture of pneumatic tire casings and more particularly to a device upon which such casings are built in the form of a relatively flat band and expanded to tire shape.

The objects of my invention will be apparent from the following specification and claims.

In the accompanying drawings which illustrate one embodiment of my invention.

Figure 1 is a front elevation partly in section showing the tire casing building, sleeve, drum and expanding tube all in assembled relation, Figure 2 is a side elevation of the drum and building sleeve in assembled relation, Figure 3 is a fragmentary sectional view showing the building sleeve withdrawn, and Figure 4 is a similar sectional view showing the casing expanded.

Referring to the drawings, 1 designates generally a rotatable supporting drum, which in the form illustrated comprises side members 2 to which are secured cylindrical members 3 as by rivets 4. Members 3 are connected together by member 5 riveted to the inner edges of members 3 as at 6, spacer rings 7 being inserted between the edges of members 3 and 5 to form a recess 8 of suitable depth, adapted to receive an inner tube, or other form of expansible core 9, in collapsed condition. Over drum 1 and tube 9 I slide a building sleeve 10 which as shown comprises a cylindrical member, provided with handles 11 to facilitate handling of the sleeve. This sleeve forms the building surface upon which the tire casing is built and to prevent relative rotary movement between the sleeve and drum 1 I provide the sleeve with one or more lugs 12 projecting radially inwardly from the outer edge of the sleeve and adapted to seat in complementary recesses 13 formed in the adjacent felly of member 2.

In operation, the sleeve 10 is slid over drum 1 having the inner tube 9 collapsed in recess 8, lugs 12 seating in recesses 13. I then proceed to construct the tire casing 14 on sleeve 10 in any well known manner, after which I withdraw sleeve 10, by means of handles 11, leaving the casing 14 overlying tube 9 as shown in Figure 3. I next inflate tube 9 through a suitable valve 15 thus expanding the casing 14 to substantially tire shape as shown in Figure 4. Tube 9 is then deflated, the casing removed, and sleeve 10 replaced on the drum ready for building the next casing.

It will be evident that by my construction I provide a device upon which the casing is built and expanded without removal from the building machine, and that I secure the positive expanding action of the inflated inner tube and at the same time provide a smooth surface upon which to build the casing.

I claim:

1. A device of the character described comprising a drum adapted to support an expanding device and removable means adapted to be positioned over said drum and expanding device to form a tire building surface.

2. A device of the character described comprising a support for an expansible tube, a sleeve adapted to be positioned over the tube to form a surface upon which a flat tire casing may be built and adapted, upon completion of the latter, to be withdrawn to permit the tube to engage the inner surface of the casing.

3. A device of the character described comprising a supporting drum provided with a recess adapted to receive a deflated pneumatic core and a rigid sleeve adapted to be positioned over the drum, to cover the core and form the building surface of the device.

4. A device of the character described comprising a supporting drum provide with a recess adapted to receive a deflated pneumatic tube, a sleeve adapted to be positioned over the drum and tube to form a tire building surface, and means to facilitate removal of the sleeve, upon completion of the tire casing, to leave the latter in position to be shaped by expansion of the pneumatic tube.

5. A device of the character described comprising a supporting drum provided with a recess adapted to receive a deflated pneumatic tube, a sleeve adapted to be removably positioned over the drum to cover the tube and form the building surface of the device, and means to prevent relative rotary movement between the sleeve and the drum.

6. A device of the character described comprising a supporting drum provided with a recess adapted to receive a deflated pneumatic tube, a sleeve adapted to be positioned over the drum and tube to form a tire building surface, means to prevent relative rotary movement between the sleeve and drum and means to facilitate removal of the sleeve, upon completion of the tire casing, to leave the latter in position to be shaped by expansion of the pneumatic tube.

7. A rigid cylindrical sleeve adapted to be positioned centrally over a tire building drum to form a building surface and means associated with the sleeve to assure rotation of the sleeve with the drum.

In testimony whereof I have signed my name to the above specification.

HARRY L. SMITH.